UNITED STATES PATENT OFFICE 2,662,827

WELL CEMENTING

Joseph B. Clark, Tulsa, Okla., assignor to Stanolind Oil and Gas Company, Tulsa, Okla., a corporation of Delaware No Drawing. Application March 12, 1946,
Serial No. 653,939

5 Claims. (Cl. 106—92)

This invention pertains in general to the art of cementing wells. More particularly, the invention is directed to a process wherein an improved hydraulic cement is employed in cementing well casing.

In the art of cementing casing in oil wells various substances have been proposed and added to hydraulic cements to improve their physical properties and to adapt them to use under such conditions where the temperature and pressure are substantially different from normal surface conditions and where the time required for the cement to reach an initial set is an important element. Various physical tests have been proposed and in some cases standardized as a means of evaluating a cement for oil wells. These physical tests include tests for hardness, strength, setting time, setting time vs. temperature, setting time vs. pressure, slump, and pumpability. Prior to this invention, however, no consideration has been given to improving the water loss properties of a hydraulic cement slurry used in wells.

It has been discovered that when a cement slurry is placed in a permeable container under pressure the slurry is dehydrated; i. e., the cement particles are filtered out of the slurry and remain in the container in a semi-solid state while the water percolates through the porous container. A similar action apparently occurs in the cementing of wells wherein the well constitutes a container which is permeable to the water in the cement slurry but filters out the cement particles, causing the cement to stiffen. In cementing casing, for example, the cement as it passes through the annulus between the wall of the well and the casing is gradually dehydrated, the rate of dehydration depending upon the permeability of the formations and the pressure differential between the slurry and the fluids in the formations, and the cement becomes stiff and produces a thick filter cake of dehydrated cement particles which bridges in the annulus and prevents further movement of the slurry up the annulus. This bridge may in some cases be broken down with extreme pressure, but generally as the pressure on the cement slurry is increased the rate of dehydration of the cement is increased, thus causing an increased tendency to produce a bridge and prohibit the proper distribution of the slurry in the annulus. I have also discovered that this property of a hydraulic cement makes it particularly unsuitable for squeeze cementing where extreme pressures are employed and thus where the tendency to dehydrate the slurry is materially increased.

It is, therefore, an object of this invention to provide an improved process for placing cement in contact with a porous member. A further object of this invention is to provide hydraulic cement having improved filtrate rate or water-loss properties; i. e., a cement having high resistance to physical dehydration. An additional object is to provide a process for producing such an improvement. A further object of this invention is to provide a system for cementing casing in a well by low-water-loss cement. These and other objects will become apparent as the detailed description of the invention proceeds.

A low-water-loss cement as the term is used herein is defined as any hydraulic cement slurry having a water loss of less than 100 cc. in 30 minutes employing the filtration apparatus and process described in American Petroleum Institute Code No. 29, second edition, July 1942, Standard Field Procedure for Testing Drilling Fluids (Tentative), section V.

The invention in brief, therefore, may be described as a cementing process wherein a hydraulic cement adapted to resist physical dehydration is used when the cement is placed adjacent a porous form. In the preferred embodiment, in which a casing is cemented in a well and the cement is placed contiguous to a permeable subterranean formation, the casing is fitted with either vertical or circumferential wall scratchers or abraders or other means such as fluid jets adapted to remove the mud or other filter cake deposit in a manner well known in the art. The casing is then lowered through the mud, water and/or oil into the well and fitted at the upper end with means which permit movement of the casing or other pipe either rotatably or vertically. Low-water-loss cement is then pumped into the casing, displacing the mud, water and/or oil first from the casing and then from the annulus or space surrounding the casing. During the time, preferably all of the time, this cement is being placed in the well, the casing is moved, causing the wall scratchers to abrade the wall of the well and thus remove any mud or other filter cake deposited thereon opposite permeable formations. While I prefer to move the casing and thus abrade the walls of the well during the time the cement is being introduced, I have found that in some cases the cement can be introduced and the casing moved alternately. The mud or other filter cake removed from the wall by abrasion or by erosion of the low-water-loss cement is moved up the well and displaced by the low-water-loss cement. This cement, due to its improved water-loss properties, then produces a thin film or filter cake of dehydrated cement particles on the wall of the well. Unlike the cements heretofore employed in cementing wells, this cement does not produce a thick filter cake which will materially decrease the area of the annulus and eventually restrict flow through the annulus or seize the casing prematurely. Instead, it quickly produces a thin impermeable filter cake which virtually prevents the loss of fluid to the permeable formations.

I have found, for example, that the cement filter cake thickness is in general a function of the filtrate rate, the pressure and time, and more specifically that the cement filter cake thickness at constant pressure for any given time varies roughly as the square root of the filtrate rate of a cement. Using the above-described standardized test apparatus and procedure modified by extending the height of the cylinder from 5 inches to 5 feet, a filter cake produced by low-water-loss cement varied generally from about 1/8 to about 5/8 inch in thickness as compared to filter cakes of 2 inches to 2 feet or more in thickness for ordinary well cements. The use of wall scratchers in a process employing relatively high water-loss cements is generally impractical due to the tendency of those cements to produce a thick filter cake opposite permeable formations penetrated by the well. This thick filter cake is often stiff enough to render the scratchers inoperative and in many cases stick or prevent further movement of the casing in the well long before adequate cement has been pumped into the annulus to insure an efficient and permanent closing of the passage. On the other hand, when wall scratchers are not employed, the mud, water and/or oil may be displaced from the well, leaving the mud filter cake. Since this filter cake is not completely impermeable and thus not permanent, and since the cement does not bond to the mud filter cake, the mud filter cake is washed away and a fluid passage soon develops, rendering the cement ineffective as a fluid seal. In my process, however, the temporary mud filter cake is removed and a chemically hydratable cement filter cake having a thickness of from about 1/32 to 3/4 inch is left in contact with the formations, the well is filled with cement to any desired depth, and sufficient cement is pumped through the annulus to displace completely all mud channels which naturally form due to the fact that the casing is not centered in the well, or due to various other causes.

To distinguish more clearly my improved cement from cements heretofore proposed, the water-loss properties or filtrate rate of characteristic oil-well cements is shown in Table I, and for comparison the water-loss properties or filtrate rate of a number of examples of low-water-loss cements is shown in Table II. These tables are prepared on the basis of a standardized test in which the above-described filtrate equipment in a slightly modified form is employed. Due to the extremely high water-loss properties of some of the cements it was necessary to employ as much as a 5000 cc. reservoir of water on top of the sample to prevent complete dehydration in less than 30 minutes. In all cases, except as otherwise shown, a 3-pound sample of hydraulic cement was mixed for a period of 10 minutes in a Hobart pastry mixer with water or other ingredients as indicated in the amount shown at the rate of 500 R. P. M. for 2 minutes and at the rate of 250 R. P. M. for the next 8 minutes. This slurry was then placed in the filtrate apparatus and the test conducted according to the above-described A. P. I. code. The filtrate rate in cc.'s for the first 30 minutes is indicated.

Table I

| Cement Brand | Type | Test No. | Water-cement ratio, gal./sack | Filtrate rate, cc./30 min. |
|---|---|---|---|---|
| A | Portland | 1 | 4.25 | 1,265 |
| A | do | 2 | 4.75 | 1,665 |
| A | do | 3 | 5.25 | 2,030 |
| A | do | 4 | 5.75 | 2,105 |
| B | do | 1 | 5.25 | 1,845 |
| B | do | 2 | 5.25 | 1,735 |
| C | do | 1 | 5.25 | 1,420 |
| C | do | 2 | 5.25 | 1,445 |
| D | do | 1 | 5.25 | 2,165 |
| D | do | 2 | 5.25 | 2,300 |
| A | Slow set | 1 | 4.25 | 3,735 |
| A | do | 2 | 4.25 | 4,270 |
| B | do | 1 | 4.50 | 2,695 |
| B | do | 2 | 4.50 | 2,320 |
| B | Slow set II | 1 | 4.50 | 3,005 |
| B | do | 2 | 4.50 | [1] 2,435 |
| B | do | 3 | 4.50 | [2] 2,595 |
| B | do | 4 | 4.50 | [3] 2,350 |
| C | Slow set | 1 | 4.50 | 2,650 |
| C | do | 2 | 4.50 | 2,430 |
| C | do | 3 | 4.50 | 2,880 |
| D | do | 1 | 4.50 | 3,600 |
| D | do | 2 | 4.50 | 3,790 |
| A | High early strength | 1 | 6.75 | 725 |
| B | do | 1 | 6.00 | 1,135 |
| B | do | 2 | 6.00 | 870 |
| C | do | 1 | 5.75 | 2,650 |
| C | do | 2 | 5.75 | 3,405 |
| C | do | 3 | 5.75 | 3,225 |
| D | do | 1 | 5.00 | 3,390 |
| D | do | 2 | 5.00 | 3,385 |
| A | Masonry | 1 | 7.00 | 594 |
| B | Portland+3% bentonite | 1 | 6.05 | 1,080 |
| B | Portland+5% bentonite | 1 | 6.50 | 960 |
| E | Masonry | 1 | 7.00 | 1,100 |
| F | Luminite | 1 | -- | 2,500 |
| G | Gypsum | 1 | -- | 635 |

[1] Mixed 5 minutes at high speed.
[2] Mixed 10 minutes at high speed.
[3] Mixed 15 minutes at high speed.

Table II

| Cement | G. | Test No. | Water-cement ratio gal./sack | Filtrate rate cc./30 min. |
|---|---|---|---|---|
| C high early strength | 1,000.0 | 1 | 6.80 | 30 |
| Polyvinyl alcohol | 10.0 | | | |
| Tributyl phosphate | 1.0 | | | |
| C high early strength | 1,000.0 | 1 | 7.90 | 20 |
| Starch (prehydrated) | 15.0 | | | |
| NaOH | 20.0 | | | |
| A masonry | 1,360.5 | 1 | 7.65 | 17 |
| Starch (prehydrated) | 40.8 | | | |
| Zeolites [1] | 40.8 | | | |
| Na₂CO₃ | 27.2 | | | |
| C high early strength | 1,000.0 | 1 | 7.90 | 15 |
| Starch (prehydrated) | 20.0 | | | |
| Na₂CO₃ | 12.5 | | | |
| E masonry | 1,360.5 | 1 | 7.65 | 7.5 |
| Starch (prehydrated) | 40.8 | | | |
| Zeolites [1] | 40.8 | | | |
| Na₂CO₃ | 27.2 | | | |
| A masonry | 1,360.5 | 1 | 7.65 | 7.0 |
| Starch (prehydrated) | 40.8 | | | |
| Zeolites [1] | 40.8 | | | |
| Na₂CO₃ | 40.8 | | | |
| E masonry | 1,360.5 | 1 | 7.65 | 6.5 |
| Starch (prehydrated) | 40.8 | | | |
| Zeolites [1] | 40.8 | | | |
| Na₂CO₃ | 40.8 | | | |

[1] Fuller's earth of the Florida-Georgia type which is not flocculated, agglomerated, or agglutinated and precipitated in a natural or synthetic saline solution such as sodium, zinc, magnesium, or calcium chloride or zinc sulfate.

It can be seen by a comparison of the results in Tables I and II that the water-loss properties of a cement may be substantially improved by certain cement additives hereinafter referred to as cement water-loss-reducing additives. These additives in general include, among other materials, materials of colloidal-particle size or which produce an insoluble precipitate of colloidal size, for example a gelatinous precipitate, and are compatible with the other ingredients in the slurry. While in the examples of low-water-loss cement the filtrate rate in cubic centimeters for the first 30 minutes varies from 6.5 to 30, a cement having a filtrate rate or water loss of 100 cc. per 30 minutes can be satisfactorily employed in most cases where it is placed under pressure adjacent a boundary of ordinary and reasonable permeability.

These cements have been found to have adequate tensile and compressive strengths, are not particularly adversely affected by the temperature and pressure conditions encountered in a well, will hydrate in the presence of well brines, have suitable setting times, and in practically all respects may be employed in the same places and under generally the same conditions as other cements. Other well-known additives may, however, be employed in certain instances to modify the various properties. For example, while some of these low-water-loss cements have retarded setting times, other set retarders such as borax or certain proteins may be added without appreciably altering the low-water-loss properties.

I have discovered also that these improved hydraulic cements can be employed to particular advantage in any cementing process wherein it is desired to inject substantial amounts of cements in a narrow passage which has a permeable boundary: i. e., where the ratio of filter area per unit volume of cement is great. In this connection the process of producing a hydraulic cement disk along a horizontal bedding plane by the application of high pressure to the cement producing a barrier to the vertical migration of fluids adjacent a well can be substantially improved by the use of a low-water-loss cement. Furthermore, a low-water-loss cement is particularly adaptable to the in situ construction of concrete piles or other objects employing porous earthen forms aid where there is a tendency of the soils to have capillary attraction of the moisture in the slurry, dehydrating the slurry until its strength after chemical hydration is materially decreased. Employing hydraulic cements of the prior art, I have found that it is impossible to produce a cement disk of any appreciable area in most wells due to the loss of water from the slurry to the permeable formations and the ensuing bridging of the cement as above described. By using low-water-loss cement, a thin impermeable cement filter cake is produced on the upper and lower boundaries of the fissure, preventing loss of water from the cement slurry and thus permitting the introduction of any desired amount of low-water-loss cement. Once having formed the cement filter cake on the upper and lower boundaries of the fissure, substantial quantities of ordinary, non-low-water-loss cements may be introduced, widening and extending the fissure appreciably.

Many other advantages of the low-water-loss cement herein described and many other low-water-loss cement compositions and applications of such compositions will become apparent to those skilled in the art. Therefore, since the invention may be realized in widely different embodiments within the scope of the claims, I intend not to be limited to the particular cement compositions and applications thereof disclosed, which are given merely as examples.

I claim:
1. A hydraulic cement slurry having a retarded tendency to dehydrate physically and adapted for cementing an oil well, said slurry consisting of Portland cement, water, and a cement water-loss-reducing additive including prehydrated starch in an amount of at least 1.5 per cent of the weight of said cement and in an amount that substantially inhibits the tendency of the slurry to lose water when said slurry contacts the permeable formations penetrated by said well under elevated pressures.

2. A hydraulic cement for cementing wells including in combination, Portland cement, and from about 1.5 per cent to about 3 per cent of prehydrated starch compatible with said cement under well conditions, said cement when mixed with water to produce a pumpable slurry having a retarded tendency to dehydrate when in contact with the permeable formations penetrated by said wells under elevated pressures.

3. A cement capable of forming a fluid slurry when mixed with water, said cement comprising a hydraulic cement mixed with from about 1.5 to 3.0% pregelatinized starch by weight of the dry cement.

4. A cement capable of forming a fluid slurry when mixed with water, said cement comprising Portland cement mixed with from about 1.5 to 3.0% pregelatinized starch by weight of the dry cement.

5. A hydraulic cement slurry, said slurry consisting essentially of Portland cement, water, and from about 1.5 to 3.0% pregelatinized starch by weight of the dry cement.

JOSEPH B. CLARK.

References Cited in the file of this patent

UNITED STATES PATENTS

| Number | Name | Date |
|---|---|---|
| 1,544,196 | Teitsworth | June 30, 1925 |
| 2,006,426 | Weiler | July 2, 1935 |
| 2,233,973 | Dunn | Mar. 4, 1941 |
| 2,234,191 | Olze | Mar. 11, 1941 |
| 2,290,956 | Gruenwald et al. | July 28, 1942 |
| 2,313,107 | Wertz | Mar. 9, 1943 |
| 2,326,577 | Teague et al. | Aug. 10, 1943 |
| 2,366,036 | Leverett et al. | Dec. 26, 1944 |
| 2,374,317 | Wright | Apr. 24, 1945 |
| 2,374,628 | Swaze | Apr. 24, 1945 |
| 2,392,352 | Wright | Jan. 8, 1946 |
| 2,417,307 | Larsen | Mar. 11, 1947 |
| 2,421,434 | Reistle et al. | June 3, 1947 |
| 2,427,683 | Ludwig | Sept. 23, 1947 |
| 2,429,211 | Andes | Oct. 21, 1947 |
| 2,469,353 | Alcorn et al. | May 10, 1949 |

FOREIGN PATENTS

| Number | Country | Date |
|---|---|---|
| 416,774 | Great Britain | of 1934 |
| 436,105 | Great Britain | of 1935 |